Apr. 3, 1923.  1,450,414.
W. E. FERGUSON.
RIVET HOLDER.
FILED JAN. 30, 1922.

Inventor
William E. Ferguson.
By Max A. Schmidt
Attorney.

Patented Apr. 3, 1923.

1,450,414

UNITED STATES PATENT OFFICE.

WILLIAM E. FERGUSON, OF LOUISVILLE, KENTUCKY.

RIVET HOLDER.

Application filed January 30, 1922. Serial No. 532,772.

*To all whom it may concern:*

Be it known that I, WILLIAM E. FERGUSON, a citizen of the United States, residing at Louisville, in the county of Jefferson and State of Kentucky, have invented certain new and useful Improvements in Rivet Holders, of which the following is a specification.

This invention relates to devices for backing up rivets during the heading operation, and its object is to provide a very efficient device of this kind which is especially adapted for use in the repair of locomotive fire boxes and for work in other close or narrow places where an ordinary dolly bar cannot be used.

Figure 1:
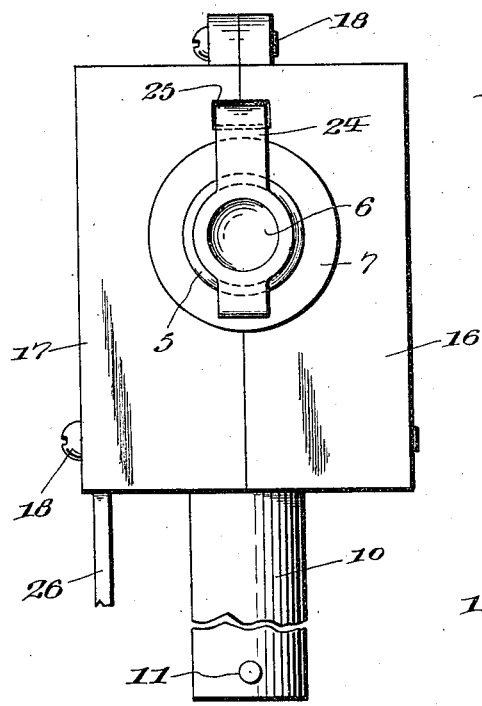
Figure 2:
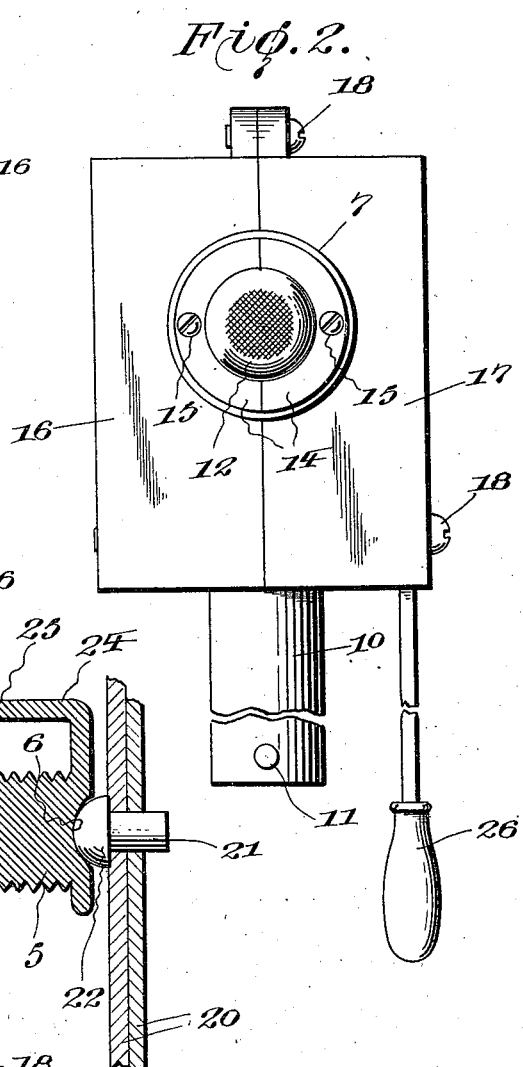
Figure 3:
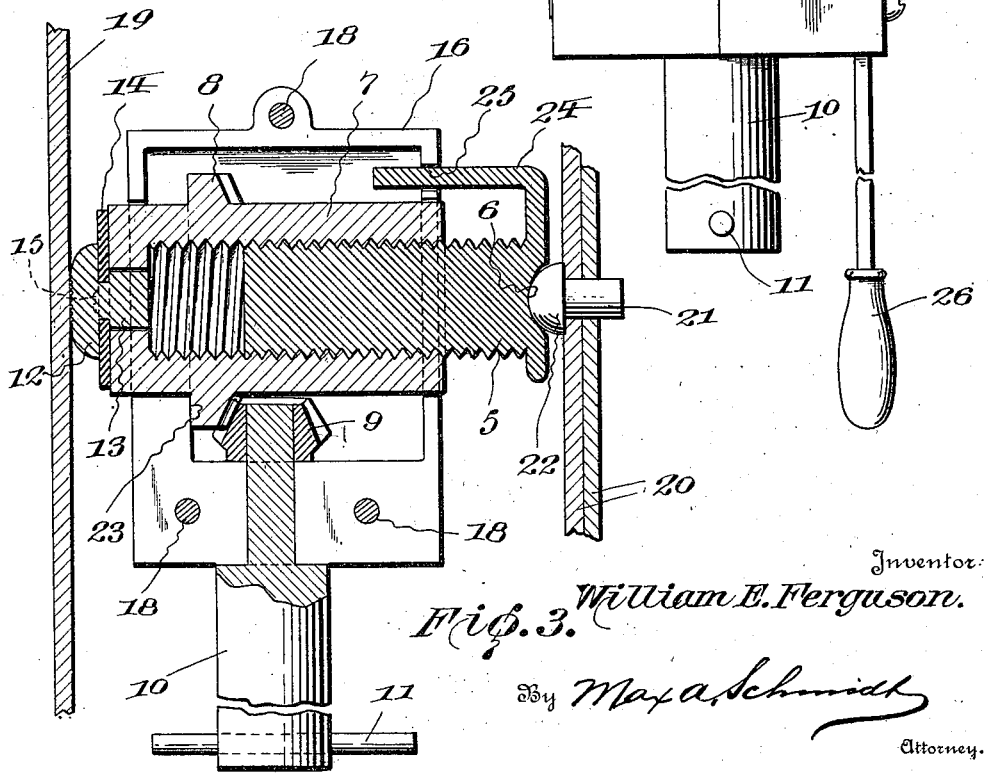

The object stated is attained by means of a novel combination and arrangement of parts to be hereinafter described and claimed, and in order that the same may be better understood, reference is had to the accompanying drawing, wherein:

Figure 1 is a front elevation of the device; Fig. 2 is a rear elevation, and Fig. 3 is a central longitudinal section.

Referring specifically to the drawing, 5 denotes a rivet holding member, one end of which has a recess 6 adapted to be entered by the head at one end of the rivet to be held while its other end is being headed. This holding member is in the form of a screw, it being externally threaded and being carried by a cylindrical nut 7. Intermediate its ends, the nut 7 is formed with a bevel gear ring 8 meshing with a bevel pinion 9 carried by a shaft 10 having a suitable operating handle 11.

The end of the holding member 5 having the rivet head seat 6 projects from one end of the nut 7, and the other end of the nut carries a swiveled foot piece 12 having a shank 13 which is in axial alinement with the member 5 and seats loosely in a central opening in this end of the nut. The nut 7 carries an annular retaining plate 14 for the foot piece 12, the shank 13 of the latter having a circumferential groove in which the inner edge portion of the plate loosely seats. The plate 14 is secured to the end of the nut 7 by screws or other suitable fasteners 15.

The support for the parts hereinbefore described is a housing composed of two opposite sections 16 and 17 which are held in assembled relations by screws 18 or any other suitable means. This housing is constructed to form a bearing for the nut 7 and it also has a bearing for the pinion shaft 10. The nut 7 projects from opposite sides of the housing to expose the parts carried by the respective ends of the nut, i. e.—the rivet seat 6 and the foot piece 12, so that the former may engage the rivet to be held, and the latter be placed against a rigid supporting surface or back rest such as the plate 19 back of the plates 20 through which passes the rivet 21 to be headed, the head of the latter which is engaged by the holding member 5 being shown at 22. Fig. 3 shows the device in position for use.

The nut 7 is a non-traveling one, it being prevented from moving in the direction of its length by having the back of the ring gear 8 abutting against a shoulder 23 in the housing composed of the sections 16 and 17, and as the ring gear is thus located between the shoulder 23 and the pinion 9, the nut cannot travel in the direction of its length, but can rotate only. The screw-like holding member 5 can travel in the direction of its length only, it being prevented from rotating by a finger 24 projecting from its forward end and extending rearwardly and parallel to said member through a slot 25 in the front end of the housing composed of the sections 16 and 17. The finger 24 seats slidably in the slot 25 so that it may follow the member 5 as it is advanced or retracted. The housing has a handle 26.

In use, the device is placed between the plate 19 and the plates 20 to be riveted, and the shaft 10 is operated to impart through the pinion 9 and the gear 8 a rotary motion to the nut 7 in a direction to advance the member 5 until its recess 6 seats over the rivet head 22, and the foot piece 12 firmly engages the plate 19, the latter serving as a back rest for the device. As the foot piece 12 and the nut 9 are relatively rotatable, the foot piece, after it comes into contact with the plate 19 will not interfere with a further rotation of the nut to jam the foot piece tightly against the plate, and the holder 5 tightly against the rivet head 22, and after the riveting operation is completed, the nut 7 can be easily turned in a reverse direction to retract the holder for removal of the device to the site of the next rivet to be operated on.

The preferred embodiment of the invention has been shown, but it will be understood that various changes and modifications in the structural details thereof may be made without a departure from the subject matter claimed hereinafter.

I claim:

1. A rivet holder comprising a traveling screw having a rivet-engaging part, a non-traveling nut carrying the screw, said screw projecting from one end of the nut, a swiveled foot-piece carried by the other end of the nut, means for operating the nut, and a support for the nut and its operating means.

2. A rivet holder comprising a traveling screw having a rivet-engaging part, a non-traveling nut carrying the screw, a ring gear on the nut, a pinion in mesh with said gear, an operating shaft carrying the pinion, and a supporting member having bearings for the nut and the pinion shaft, said supporting member having a shoulder between which and the aforesaid pinion the ring gear is positioned for preventing travel of the nut in the direction of its length, and the screw having a finger extending in the direction of its length and being slidably connected to the supportng member for preventing rotation of the screw.

3. A rivet holder comprising a traveling screw having a rivet-engaging part, a non-traveling nut carrying the screw, said screw projecting from one end of the nut, a swiveled foot-piece carried by the other end of the nut, a ring gear on the nut, a pinion in mesh with said gear, an operating shaft carrying the pinion, and a supporting member having bearings for the nut and the pinion shaft, said member having a shoulder between which and the aforesaid pinion the ring gear is positioned for preventing travel of the nut in the direction of its length, and the screw having a finger extending in the direction of its length and being slidably connected to the supporting member for preventing rotation of the screw.

In testimony whereof I affix my signature.

WILLIAM E. FERGUSON.